(12) United States Patent
Bilbrey

(10) Patent No.: US 8,565,577 B2
(45) Date of Patent: *Oct. 22, 2013

(54) SYSTEM AND METHODOLOGY FOR UTILIZING A PORTABLE MEDIA PLAYER CROSS-REFERENCE TO RELATED APPLICATIONS

(75) Inventor: Brett Bilbrey, Palatine, IL (US)

(73) Assignee: Mantrose Group Limited Liability Company, Dover, DE (US)

( * ) Notice: Subject to any disclaimer, the term of this patent is extended or adjusted under 35 U.S.C. 154(b) by 489 days.

This patent is subject to a terminal disclaimer.

(21) Appl. No.: 12/891,621

(22) Filed: Sep. 27, 2010

(65) Prior Publication Data

US 2011/0081127 A1    Apr. 7, 2011

Related U.S. Application Data

(60) Continuation of application No. 11/805,981, filed on May 25, 2007, now Pat. No. 7,805,051, which is a division of application No. 09/847,633, filed on May 2, 2001, now Pat. No. 7,239,800.

(51) Int. Cl.
*H04N 5/765* (2006.01)
*H04N 5/932* (2006.01)

(52) U.S. Cl.
USPC .......................................... 386/232; 386/220

(58) Field of Classification Search
USPC .......... 386/220, 219, 232, 239, 248, 314, 353
See application file for complete search history.

(56) References Cited

U.S. PATENT DOCUMENTS

| | | | |
|---|---|---|---|
| 5,371,551 A | 12/1994 | Logan et al. | |
| 5,377,051 A | 12/1994 | Lane et al. | |
| 5,627,655 A | 5/1997 | Okamoto et al. | |
| 6,233,389 B1 | 5/2001 | Barton et al. | |
| 6,369,835 B1 * | 4/2002 | Lin .............................. | 715/726 |
| 7,239,800 B2 | 7/2007 | Bilbrey | |
| 7,805,051 B2 | 9/2010 | Bilbrey | |
| 2002/0029087 A1 | 3/2002 | Mayne et al. | |

* cited by examiner

*Primary Examiner* — Robert Chevalier
(74) *Attorney, Agent, or Firm* — Knobbe, Martens, Olson & Bear LLP

(57) ABSTRACT

A low-cost portable digital video player receives proprietary compressed data from a source such as a personal video recorder (PVR), and displays the data on an integral display. A rewritable non-volatile memory of the player stores the data and a media decoder of the player transforms and decompresses the data. According to one embodiment the decoder transforms the data to a non-proprietary format, prior to storing the data. According to a second embodiment, the memory stores the data in the proprietary format, and decoder transforms and decompresses the data in response to an instruction from a user input device, and transfers the decoded data to a display. A cradle for the player provides communications to the PVR, a power supply and optionally further storage capacity.

20 Claims, 11 Drawing Sheets

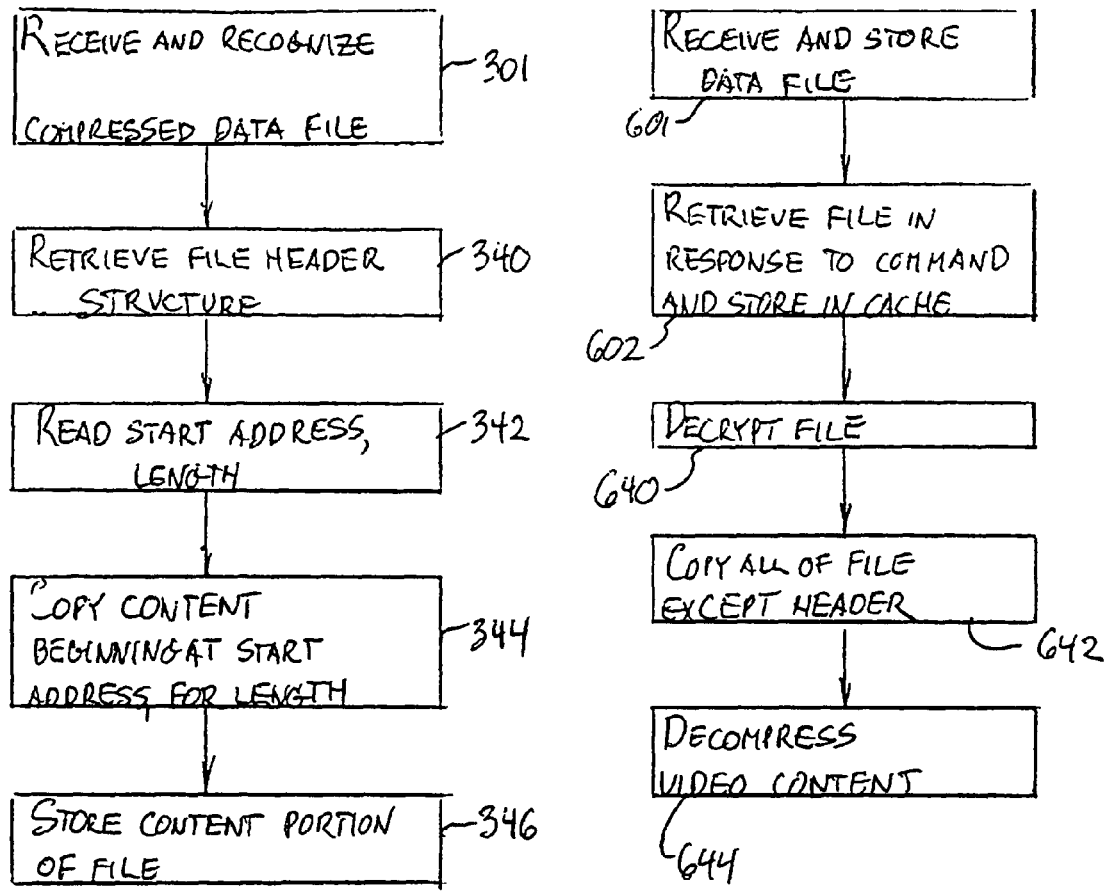

SYSTEM AND METHODOLOGY FOR UTILIZING A PORTABLE MEDIA PLAYER CROSS-REFERENCE TO RELATED APPLICATIONS

CROSS-REFERENCE TO RELATED APPLICATIONS

This application is a continuation of U.S. application Ser. No. 11/805,981, filed May 25, 2007 and entitled "SYSTEM AND METHODOLOGY FOR UTILIZING A PORTABLE MEDIA PLAYER," which is a divisional of U.S. application Ser. No. 09/847,633, filed May 2, 2001, now U.S. Pat. No. 7,239,800 entitled "PORTABLE PLAYER FOR PERSONAL VIDEO RECORDERS," each of which is hereby expressly incorporated by reference in its entirety.

BACKGROUND OF THE INVENTION

1. Field of the Invention

The present invention relates to portable video display devices, and particularly to low-cost, portable video display devices which reproduce compressed digital video data for display. The invention further relates to a portable video display device for reproducing compressed video data recorded by a personal video recorder.

2. Description of the Related Art

Personal video recorders (PRVs) such as provided by Tivo and Replay, are a relatively recent development compared with the older tape-based video cassette recorders. PVRs record broadcast video data in a proprietary, compressed video format based upon a standard encoded, audio-visual, digital, compressed format, e.g., MPEG-2, and provide a convenient way to time-shift a broadcast video program. Unfortunately, conventional PVRs are not portable, and thus do not provide a convenient way to "place-shift" (permit recording and viewing recorded broadcast video programs in alternate locations).

Accordingly, a first object of the present invention is to provide a low-cost portable playback device for reproducing compressed digital information at a time and a place different from the time and place of the original video reception.

A further object of the present invention is to provide a portable playback device configured to reproduce compressed video information recorded by a PVR for viewing.

These and other objects of the present invention are discussed or will be apparent from the detailed description of the invention.

SUMMARY OF THE INVENTION

A low-cost, portable digital video player is provided which includes a rewritable, non-volatile memory (such as a hard disk), a media decoder, a user input device and a display. The player receives the pre-recorded video information (previously recorded in a compressed proprietary format by a PVR or the like), and either transforms the compressed video information into a non-proprietary format and stores the compressed video information in the memory, or stores the video information in a compressed proprietary format in memory, and upon playback, decrypts and decompresses the data prior to reproducing the audio and video data for viewing.

Preferably, the media decoder is a special function processor which is capable of decrypting the received data into a non-proprietary video format in real-time, on-the-fly or otherwise. The decoder, responsive to instructions received from the player's user input device, retrieves and decompresses the compressed video information, and passes the retrieved and decompressed data to the display.

The portable digital video player is provided with at least one of a speaker and a headphone jack for reproducing an audio portion of the video information received from the media decoder of the device.

In a further aspect of the invention, the portable, digital, video player is provided as a component of a system that also includes a cradle. The cradle has a compressed video data input port, a compressed output data input port, an analog audio-visual input port and an encoder. An input of the encoder is coupled to the analog audio-visual input port and produces a compressed video data signal responsive to receiving analog visual data. An output of the encoder is coupled to the compressed video data output port. The compressed video data input port of the portable player is connected to the compressed video data output port of the cradle when the portable player is docked in the cradle. Conveniently, the cradle also supplies DC power, and may have additional storage media incorporated into it to store compressed video data. The cradle may also have a decoder which is coupled to its compressed video data input port for receiving compressed video data. The decoder decompresses the received compressed video data signal into an analog audio-visual signal. Preferably an output of the decoder is coupled to the analog audio-visual output port of the cradle to transmit a decoded analog audio-visual signal to, e.g., a monitor or other display device.

BRIEF DESCRIPTION OF THE DRAWINGS

The invention will be best understood by reference to the following Detailed Description in conjunction with the drawings, in which like characters identify like parts and in which.

DETAILED DESCRIPTION OF THE PREFERRED EMBODIMENT

Figure 1:
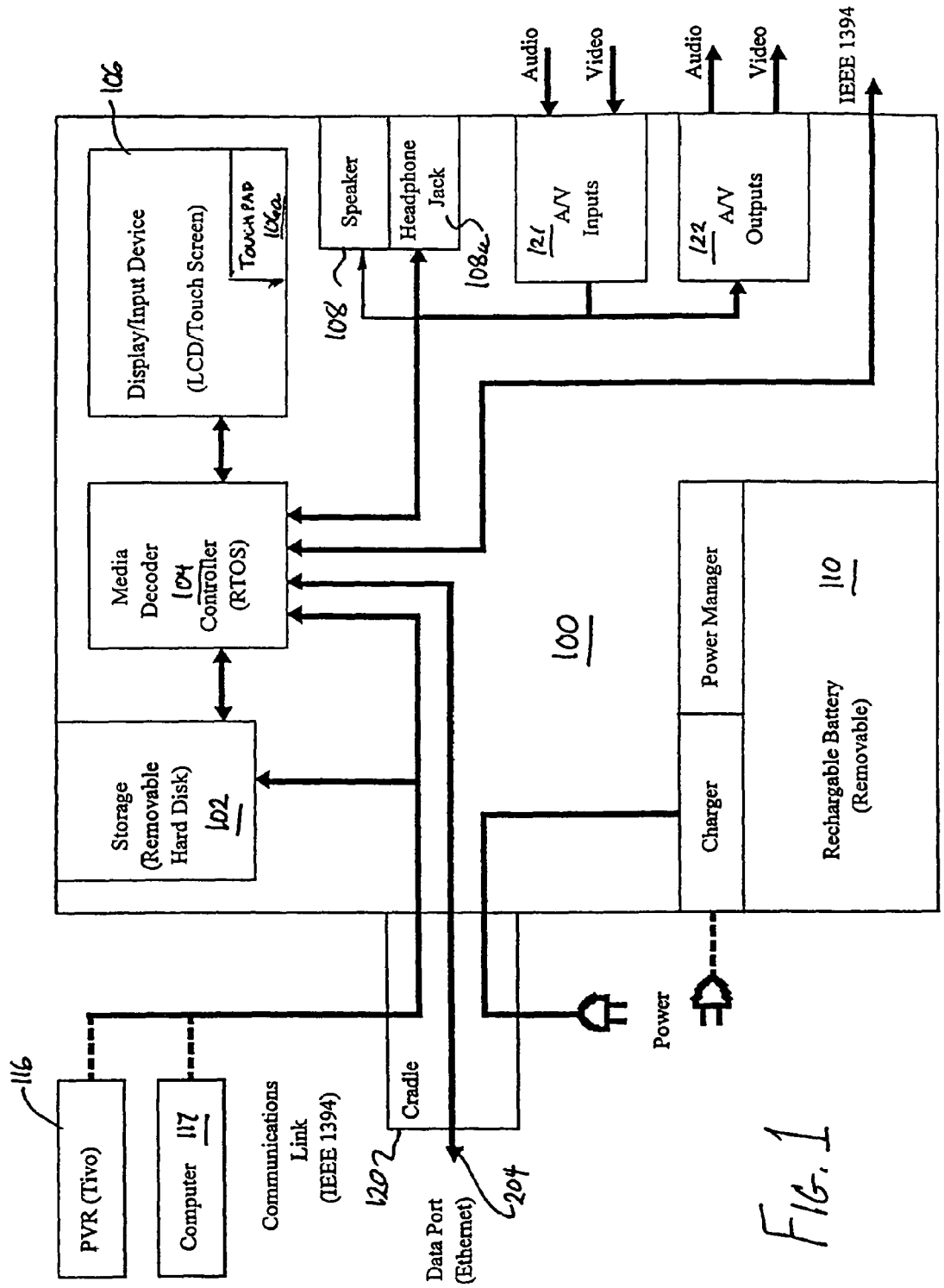
FIG. 1 is a schematic diagram of a low-cost, portable, video playback device according to the present invention.

FIG. 1 is a schematic diagram of the low-cost, portable, video playback device (100) according to a first embodiment of the present invention.

The portable video playback device (100) includes: a storage medium (102), a media decoder (104), a display screen (106), at least one speaker (108), and a power supply (110). The storage medium (102) should have a storage capacity of at least twenty gigabits of data and be able to write and read data at a rate of at least 1.2 Mb/second. It must also recognize an input data format over a communications channel, e.g., IEEE 1394 or Ethernet. For example, storage medium (102) can be a Quantum 1394 hard drive of a 20G, 30G or greater size.

Storage medium (102) preferably incorporates an output shift register with a serial output. It accepts read/write commands, with addresses, from a media decoder (104) to select disk space for reading or writing.

The media decoder (104) preferably is a special purpose processor used to decode and decompress compressed video data in real-time, on-the-fly or otherwise. According to one embodiment, the media decoder (104) performs a preliminary step of decrypting the data prior to storing the data in compressed form on the storage medium (102). Alternatively, the storage medium (102) stores the data in the format recorded by a PVR (116), and the media decoder (104) decrypts and decompresses the data in real time, on-the-fly or otherwise prior to the output of the data to a display and an audio output.

Figure 2:
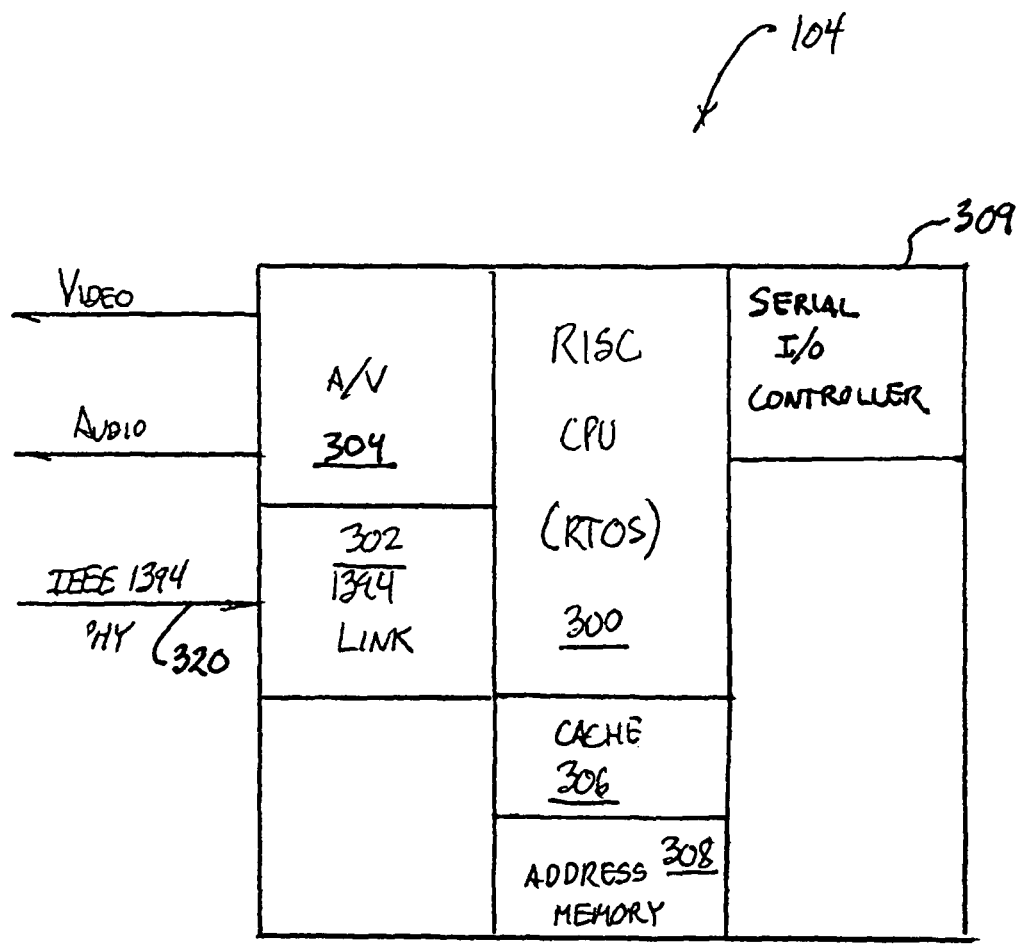
FIG. 2 is a more detailed block diagram of a media decoder ((104) of FIG. 1) incorporated into a preferred embodiment of the invention.

FIG. 2 is a block diagram showing the minimal functional requirements of a media decoder (104) capable of carrying out the invention. The media decoder (104) preferably is built around a reduced instruction set chip (RISC) CPU (300) that is preferably programmed with a real-time operating system (RTOS). CPU (300) should be able to process at least 33 million instructions per second (MIP/S). In the illustrated embodiment, the CPU (300) communicates with an IEEE 1394 Firewire circuit or physical layer (302) and an analog audio/video interface circuit (304). Alternatively, the IEEE 1394 interface circuit (302) may be replaced by an Ethernet interface circuit, or both of these kinds of data port interfaces or even other interfaces could be present in order to give the user flexibility in choice of data input. A small cache memory (306) is used to hold that portion of the compressed data stream that is presently being processed by CPU (300). The media decoder (104) also needs an address memory (308). Communication to the graphical user interface, display and audio output is made through a serial input/output controller (309).

In a preferred embodiment, a network media processor (e.g., a C-Cube DoMiNo or other commercially available network media processors) is used for the media decoder (104). In the illustrated embodiment, the C-Cube DoMiNo decoder (104) is optimized for decoding MPEG-2 data. Network media processors exist (e.g., a DoMiNo) which have far more capabilities than are actually needed to perform the functions minimally necessary for carrying out the invention, but they are self-contained and relatively inexpensive.

Returning to FIG. 1, and according to a preferred embodiment, the display (106) is a touch-screen which serves both as an input device and a display screen. However, a separate, dedicated input device (106a), e.g., a touch-pad or mouse may be added. The display (106) may incorporate an ion emission plate, plasma screen or other flat panel technology. Preferably, the display (106) has a low rate of power consumption, and is lightweight and robust. Particularly preferred for display (106) is an ion emission plate; these display devices exhibit excellent visual characteristics (they can be viewed from widely different angles) and have relatively low power consumption. Display (106) should be at least 8".times.5" and more preferably is 10".times.8" in size. In one embodiment, display (106) is sized to receive typical movie formats.

The speaker (108) may be any conventional low-power speaker such as is known in the art. The speaker (108) may be replaced by a headphone jack (108a). Alternatively, both a speaker (108) and a headphone jack (108a) may be provided.

The power supply (110) may be a conventional battery. Preferably, the battery (110) has a rechargeable chemistry such as a lithium ion, NiCad or nickel metal halide and has sufficient voltage and capacity (e.g., 50 watt-hours) to power the components of player (100) for a length of time that is on the same order of magnitude as the length of play of the video data which can be recorded on storage medium (102).

Preferably, the power and most input and output communications of the player (100) are routed through a cradle (120), which will be described in further detail below.

The portable video playback device (100) is adapted to receive compressed video data from a conventional PVR (116), a personal computer (117), over a local area network (e.g., Ethernet) (204), over a wide area network which may consist of or include the Internet, or from wireless sources by way of an antenna and an RF receiver (not shown). In operation, the portable video playback device (100) receives compressed data, which is stored (either in encrypted or decrypted format) on the storage medium (102). The media decoder (104), upon receiving appropriate commands from input device (106), selects all or a portion of the compressed video data stored on disk (102) for retrieval, decompresses this video data, and passes the decompressed data streams on to the display (106) and audio outputs (108, 108a).

The PVR (116) stores its compressed video files in a proprietary format, which must be converted at some stage by the portable video playback device (100). Video data may be transmitted from the PVR in packets with embedded MPEG-2 data.

The PVR (116) may modify a public compression standard such as MPEG-2 by providing a header on each file, by encrypting the file by a known hash algorithm, or both. According to the invention, whatever modifications the PVR makes to the standard compressed video format, the portable player (100) removes. As noted previously, the personal media player (100) may store compressed data in the storage medium (102) using the proprietary PVR format, or may decrypt the data and store decrypted, compressed data in the memory (102).

The decoding algorithms employed by decoder (104) of FIG. 2 are matched to the proprietary video format made available by the PVR (116). The compressed data may be stored on the storage media (102) in a variety of formats, e.g., MPEG-1, MPEG-2, MPEG-4, MPEG-7 or AVI, as are known in the art. While it is preferred that the compressed data be converted from the proprietary and/or encrypted PVR format prior to being stored on the storage medium (102), this conversion could be performed upon retrieval from the storage medium (102).

Figure 3:
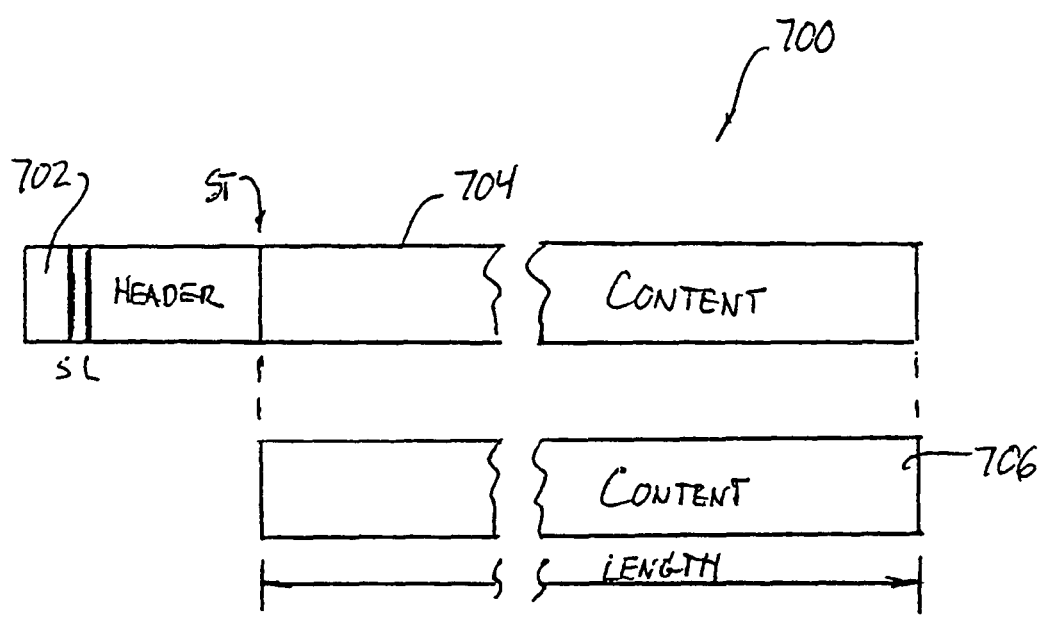
FIG. 3 is a diagram showing steps in decrypting one conventional type of proprietary, compressed, digital video file.
Figures 4A, 4B:
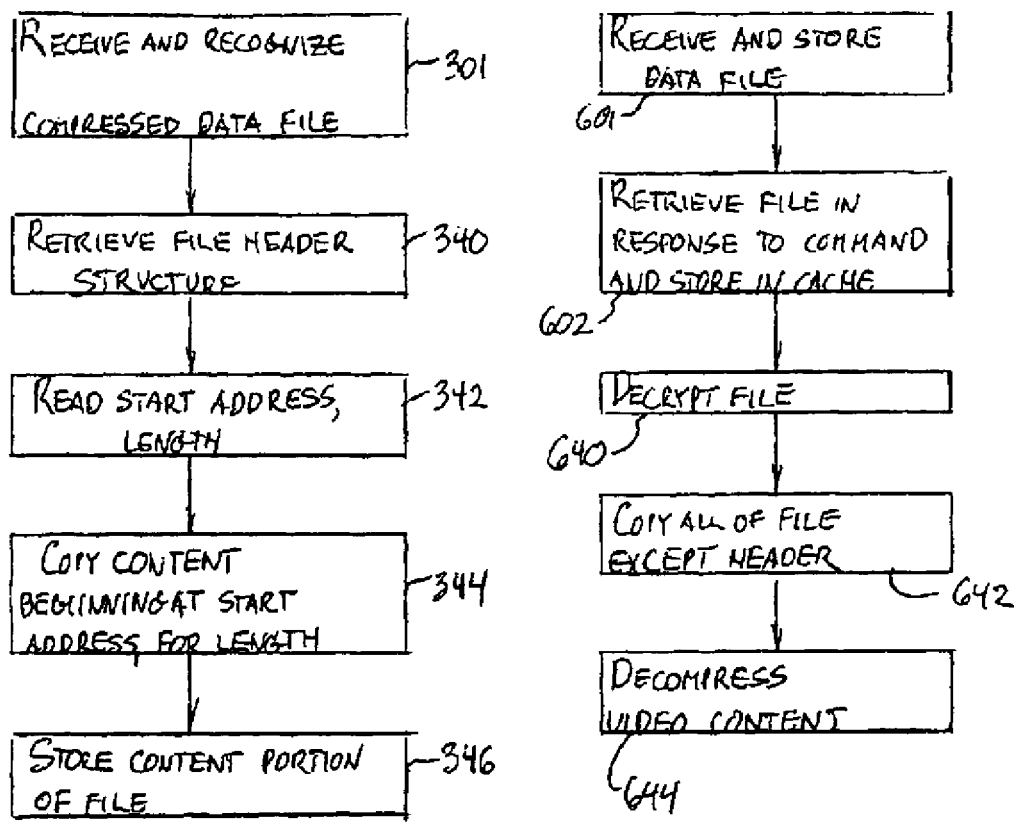
FIGS. 4A and 4B are flow diagrams showing processes for transforming compressed video data.

FIG. 4A illustrates a representative process for decrypting a compressed video data file out of a proprietary format into a standard compressed video format, e.g., MPEG-2. One such proprietary format is shown at (700) in FIG. 3. This data file (700) has a header (702) and a compressed video content portion (704). At predetermined positions within the header (702) are a start address byte S and a length byte L.

At step 301 in FIG. 4A, the portable video player receives and recognizes a compressed data file, e.g., file (700) in FIG. 3. A beginning portion of file (700) is stored in a buffer while file (700) is being decrypted. At step 340 a file header structure, which can be stored in a non-volatile memory component, e.g., memory (308) of FIG. 2, is retrieved by a decoder, e.g., (104) of FIG. 1 and FIG. 2. The file header structure is used at step 342 to determine where a start address byte S and a length byte L are positioned in the header (702) of FIG. 3. The decoder (104) then reads the start address byte S and the length byte L from these locations.

In FIG. 4A, the start address byte S gives decoder (104) and offset, as measured from the beginning of the file (700), to where the compressed video content begins at start address position ST of FIG. 3. The length byte L is used to determine the length of the compressed video content. Now knowing the start address and length, at step 344 the processor or decoder (104) starts copying the video content portion (704) of file (700) into another sequence of memory locations (706). The decoder (104) therefore has available to it a conventional compressed data file to copy onto storage medium (102) of FIG. 1, which it does at step 346.

FIG. 4B is an alternative process flow diagram showing how an input proprietary data file is processed according to a second embodiment of the invention. At step 601, a data file is received and is stored on mass storage medium (102) of FIG. 1 as a media file. At step 602, a command is received, instructing the media decoder (104) of FIG. 1 and FIG. 2 to retrieve the media file. The media decoder (104) temporarily stores portions of the file in the memory cache (306) of FIG. 2 as the CPU (300) operates on it. At step 640 the data file is decrypted, e.g., by applying a predetermined key to it in the instance that an encryption algorithm had been applied to the data file by the PVR (116) of FIG. 1 prior to transmission. At step 642, a beginning, predetermined, proprietary header as above described is effectively stripped from the decrypted data packet by copying only the video content of it to another memory location. At step 644, the data file, still in a compressed format, e.g., MPEG-2, is decompressed into analog audio and video components and is ready to be streamed to the display (106) and to the audio output (122) of FIG. 1.

The embodiment illustrated in FIG. 4A presupposes that the proprietary format transmitted by the PVR (116) of FIG. 1 will not be encrypted, e.g., by a hash algorithm, but will be associated with a proprietary header.

The process outlined in FIG. 4B assumes both decryption by a key and removing a header. It is also possible to provide a system in which only hashing and keyed decryption occurs. Decrypting and header stripping can occur entirely or partly before or after storage on storage medium (102) of FIG. 1.

To contain cost and minimize complexity it is preferred, for a low-cost embodiment, that the portable video playback device (100) be strictly a playback device, which would not provide recording capability other than that necessary for receiving the proprietary input data stream. Accordingly, functions of the media decoder (104), in this embodiment, are optimized for transforming and decompressing data. In other, embodiments the player (100) could have broader read/write capabilities.

Figure 5:
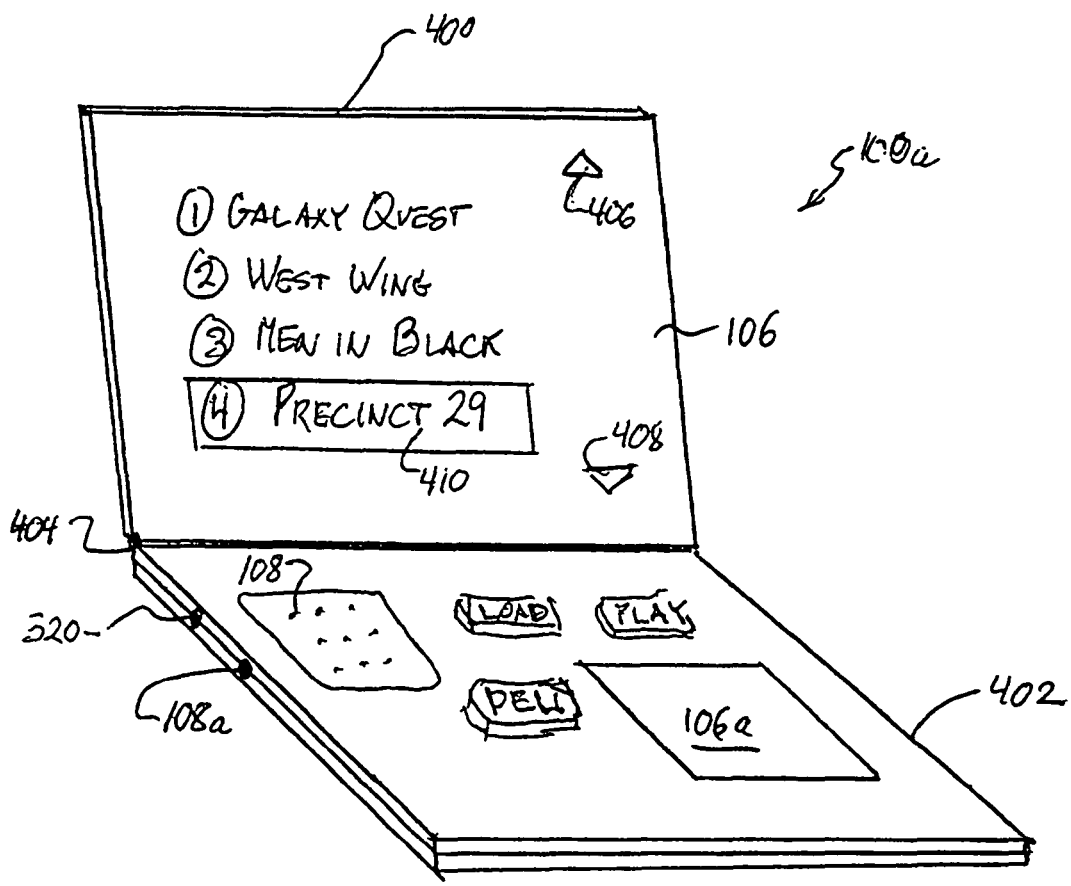
FIG. 5 is an illustration of a portable player according a "notebook" embodiment of the invention.

FIG. 5 shows an exemplary representative physical embodiment (100a) of a portable media player. The illustrated embodiment (100a) takes a "notebook" or "laptop" form in which a screen panel (400) is hinged to a lower panel (402) via a hinge (404). While the player (10a) looks like a laptop computer, it is lighter, consumes less power, and is far less expensive than laptops now made, because the required logic, electronics and peripheral devices are much simpler. Further, laptop personal computers now made are not standard-equipped to decrypt proprietary PVR video formats. The "laptop" embodiment (100a) is advantageous because it provides a method for the user to protect the screen (106) when not in use by folding it down onto, and securing it to, the lower panel (402).

Lower panel (402) includes the storage medium, e.g., storage medium (102) of FIG. 1, a speaker (108), and a touchpad (106a). In the illustrated embodiment, PLAY, DEL and LOAD keys are shown in the lower panel (402). These functions could alternatively be implemented in areas of the touch-screen (106). The lower panel (402) also includes a headphone jack (108a) and an IEEE 1394 firewire or other port (320) for loading the video data that is to be desired to be played later.

In FIG. 5, an introductory screen is illustrated showing the titles of the various video clips which have been loaded onto the storage medium. Scroll arrows (406) and (408) may be touched by the user to scroll through the entire content of the storage medium. One of the titles will be highlighted, as is shown at position 410. Pressing the DEL key will delete this title, thus freeing up the storage space devoted to it. Pressing the PLAY key will begin the playback of this clip.

In a loading sequence, onboard logic contained within player (100a) inspects which clips have been stored on a PVR (or other external system), e.g., PVR (116) of FIG. 1, and permits the user to select which of these should be copied onto the storage medium of the portable player. In a load mode, the screen (106) shows possible titles which are available for loading from the PVR. A selection as by highlighting of one of these and pressing the LOAD key causes this compressed video clip to be loaded. Appropriate software monitors available storage space on the storage medium (102) of FIG. 1, and reports if the size of the video clip selected for loading exceeds available space in the player.

Figure 6:
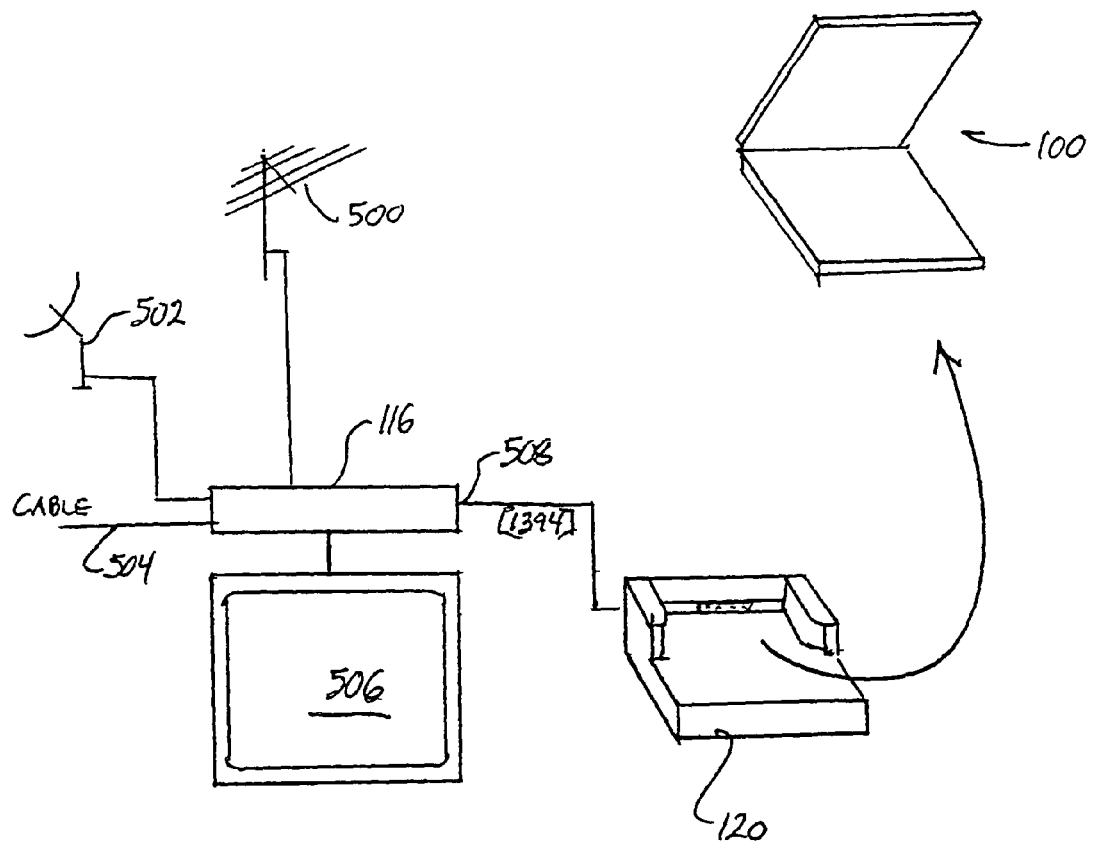
FIG. 6 is a schematic diagram showing how the portable player of the present invention permits both "time-shifting" and "place-shifting" of a broadcast video data file, illustrated with a cradle (120) for communicating with the portable player (100)

FIG. 6 is a schematic diagram showing how the invention permits both "time-shifting" and "place-shifting" of a broadcast video data file. The personal video recorder (116) can receive television signals or other video signals from such sources as direct UHF or VHF through antenna (500), a satellite dish (502) or a cable (504). An on-board receiver in the personal video recorder (116) can be used to pick up these signals, or alternatively a receiver module of an associated television set (506) may be used to pick up the video signals. The PVR (116) has the capability of "time-shifting" and compressing these video data signals to permit the user to play them back at a time other than their initial broadcast.

In one embodiment of the present invention, the PVR (116) has a data output port, e.g., an IEEE 1394 firewire output port (508), which the user may connect to the input port of cradle (120). The player (100) is initially docked in cradle (120). The user can then download selected tracks or data files from recorder (116) or other source (e.g., storage medium (130), or via wired or wireless receiver communications) onto the portable media player (100). The user then removes the player (100) from the cradle (120) and transports the portable media player with him or her, as shown, to play at his or her leisure at a remote location. This permits the playback of a video data file as shifted both in time and in space.

Figure 7:
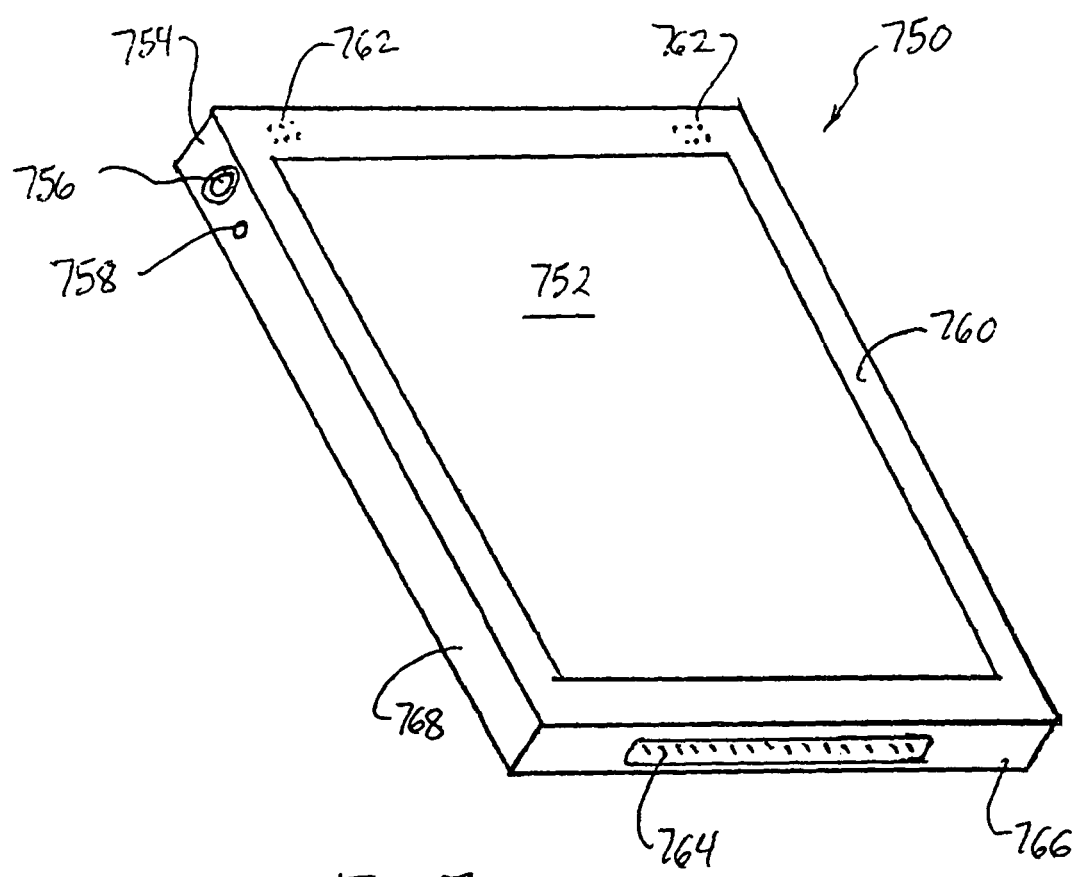
FIG. 7 is an illustration of a "slate" embodiment of a portable player according to the invention.

In FIG. 7, in place of a single speaker, stereo speakers (762) could be provided with maximum spatial separation between them. The "slate" portable player embodiment (750) has a flat panel display (752); preferably, a low-power-usage display, e.g., an ion emission plate. The dimensions of display (752) can be approximately 8.times.10 inches, or slightly smaller than this, so that the entire dimensions of the slate embodiment (750) are 8½.times.11 inches. Alternatively, the display (752) can have dimensions proportionate to matching typical analog video movie formats, e.g., 3:4, to fit a 1200 pixel high by 1600 pixel wide format.

In this illustrated embodiment, the display (752) is also a touch-screen, and all of the functionality associated with the portable player (750) is controlled by pressing various portions of the display (752). A power button (756) can be placed on a side of the portable player (750). The portable player (750) can also have an audio headphone jack (758) for headphones. These controls and data ports are preferably placed near an upper end of the player (750), as shown. A portion of the front surface (760) can be occupied by separated speakers (762). A multiple pin connector (764) may be built into surface of the case (768). For stability while disposed in a cradle (described below), it is preferred that the heavier electronic components of the portable player (750) occupy the lower two thirds of the volume of the case (768).

Figure 8:
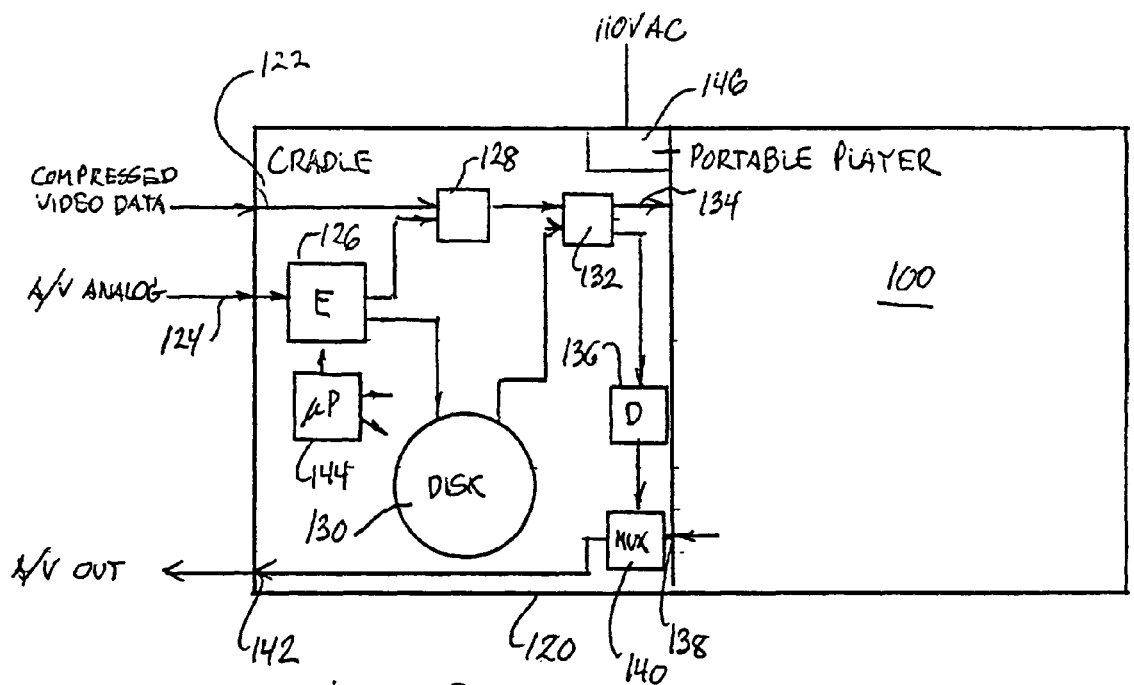
FIG. 8 is a schematic electrical diagram of a cradle used with the portable player of the invention.

Both the "laptop" and "slate" embodiments of the portable players according to the invention are designed to be used with a respective type of cradle (120), illustrated in FIG. 8 and FIG. 6. The cradle (120) provides a base designed to physically receive the portable players (100 and 100*a*), as will be described below.

In FIG. 8, the cradle (120) provides a permanent connection to external power and data communications. Compressed video data, as from a personal video recorder, is received on a compressed video data port (122). Analog audio-visual signals can be received at an analog audio-visual signal data port (124), which includes two audio channels and one video channel. The analog audio-visual signals are input to an encoder (126), one output of which is connected to a multiplexer (128) and to a mass storage medium (130), e.g., a hard disk or other read/write memory device with a large capacity. Multiplexer (128) has an output which is connected to a first input of a multiplexer/demultiplexer (132). An output (134) of multiplexer/demultiplexer (132) is connected to a data input port of a portable player (100 or 100*a*).

An input of the multiplexer/demultiplexer (132) is connected to an output of the storage medium (130). A second output of the multiplexer/demultiplexer (132) is connected to a decoder (136), which is operable to decode a compressed video data signal into analog audio-visual signal format. An input (138) of a multiplexer (140) is connected to an analog audio-visual output port of a portable player (100 or 100*a*). One input of the multiplexer (140) is connected to the decoder (136). An output of the multiplexer (140) is connected to an analog audio-visual output port (142) of the cradle. This output port may be connected to conventional display and audio devices. A processor (144) controls the operation of encoder (126), storage medium (130), multiplexer (128), multiplexer/demultiplexer (132), and multiplexer (140). A power input port (146) transforms and rectifies AC power and serves as a power supply for the cradle electronics as well as a recharging power source for a battery, e.g., battery (110) of FIG. 1.

Figure 9:
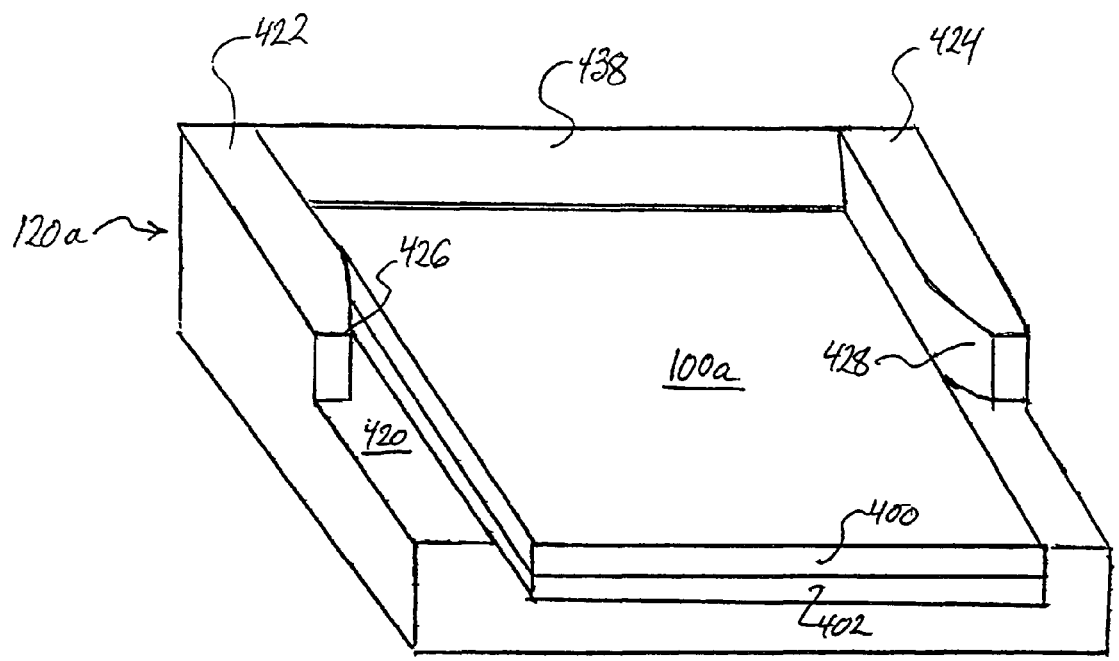
FIG. 9 is an illustration of one embodiment for a cradle used in conjunction with a "notebook" embodiment of a portable player according to the invention.
Figure 10:
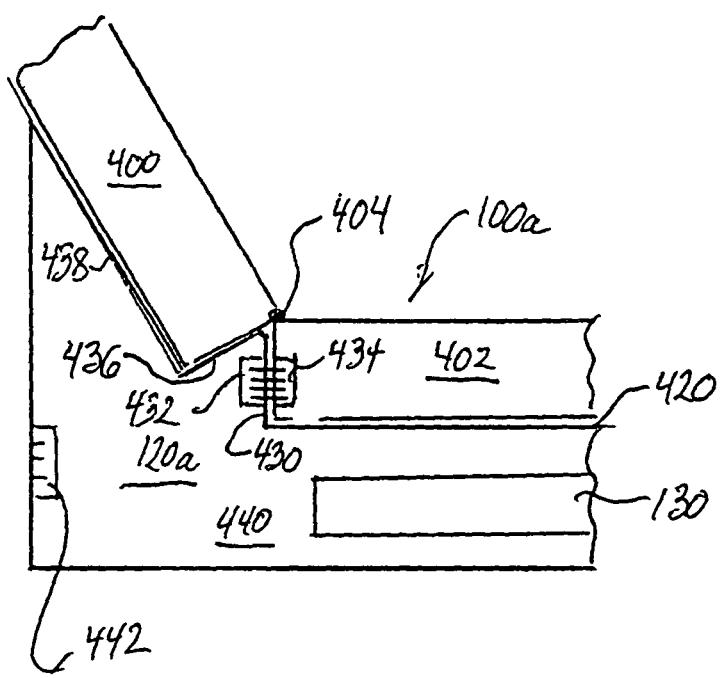
FIG. 10 is a cross-section diagram of the cradle shown in FIG. 9, shown with a display panel of an installed player shown in an open position.

FIGS. 9 and 10 show an exemplary physical embodiment of a cradle (120*a*) which is meant to receive a "laptop" personal video player (100*a*). In this embodiment, a lower panel (402) of the portable video player (100*a*) rests on a horizontal, flat receiving face (420) of cradle (120*a*). The depth of face (420) is allowed so that a user may grasp the protruding portable video player (100*a*) for ease in extraction. Left and right walls or arms (422) and (424) have respective chamfered interior sidewalls (426 and 428) for ease in guiding the player (100*a*) toward a rear player connection panel (430) of FIG. 10 for insertion, into which a multiple-pin electrical connector (432) is mounted. The connector (432) receives respective pins of a rear connector (434) of player (100*a*).

In the illustrated embodiment of FIG. 10, the user may view player (100*a*) while it is docked in cradle (120*a*), and for this reason the cradle (120*a*) has a recess (436) and a sloped surface (438) to permit the opening and support of panel (400) of player (100*a*) in and to an open position. Base (440) of the cradle (120*a*) is made thick enough to house a storage medium (130). A rear electrical connector (442) is used to connect the cradle (120*a*) to AC power, at least one data source, and optionally, one or more video playing devices with analog audio and video lines.

Figure 11:
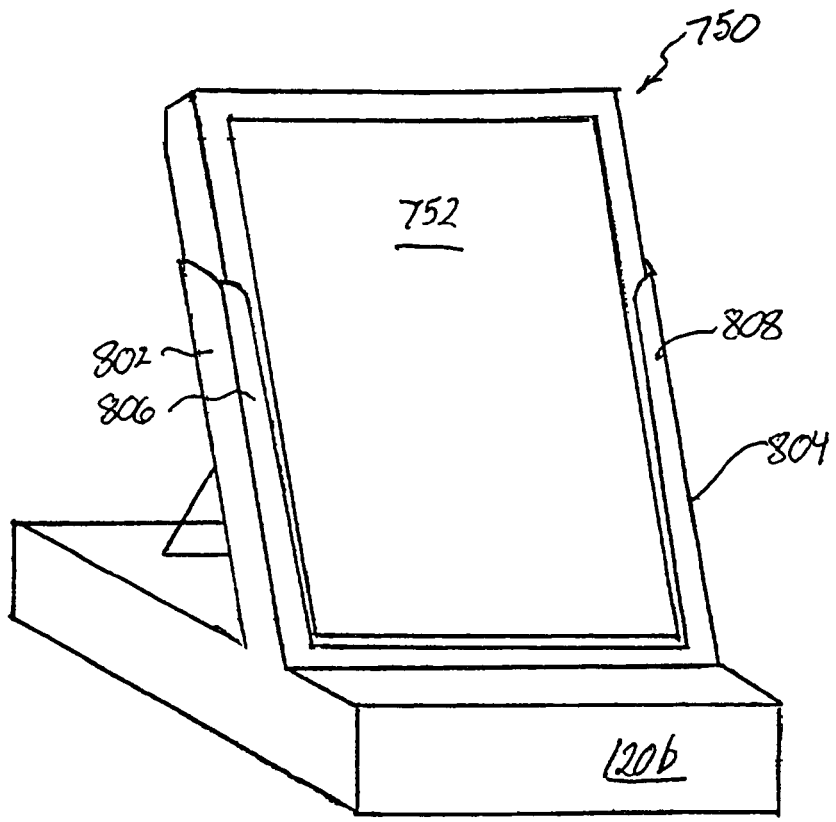
FIG. 11 is an illustration of a cradle into which the "slate" portable player of FIG. 8 may be docked.
Figure 12:
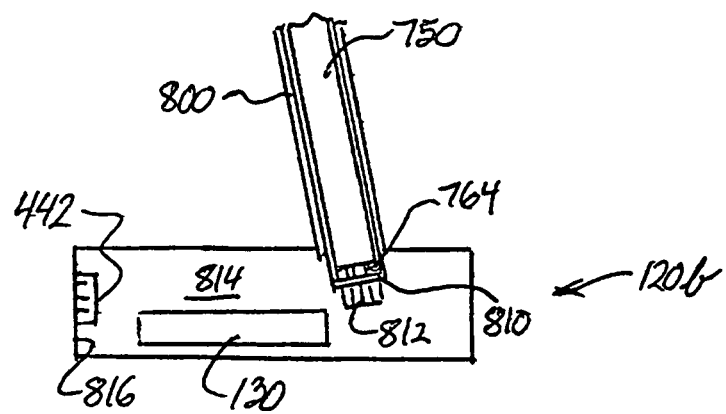
FIG. 12 is a cross-section diagram of the cradle shown in FIG. 11.

FIGS. 11 and 12 show an exemplary physical embodiment of a cradle (120*b*) which is meant to receive a "slate" style personal video player (750). A "slate" video player (750) is inserted into a receptacle formed by a back upstanding wall (800) of FIG. 12, left and right side panels (802 and 804) with respective front flanges (806 and 808), and a bottom receiving surface (810) into which a multiple-pin electrical connector (812) is mounted. This receptacle props up the portable player (750) to a viewable position. The top margins of left and right side panels (802 and 804) and respective front flanges (806 and 808) are curved or sloped to ease the sliding of the player (750) for registration into the receptacle. Wall (800), left and right side panels (802 and 804) and respective front flanges (806 and 808) are preferably more than half, but less than all, of the height of the player (750), so that the player (750) may stably reside in the cradle (120*b*) and may be easily removed from it. The flanges (806 and 808) must not be so wide that the area of the screen (752) is occluded.

A base (814) of the cradle (120*b*) provides space for a disk or other mass storage medium (130). As in cradle (120*a*), a multiple-pin electrical connector (442) is mounted to a rear panel (816) to provide connector to AC power, at least one source of data, and possibly other remote devices.

While various embodiments of the present invention have been shown and described, it should be understood that other modifications, substitutions and alternatives can be made without departing from the spirit and scope of the invention, which should be determined from the appended claims.

What is claimed is:

1. A method comprising:
   receiving, at a computer processor, a request from a media device for multimedia content stored in a proprietary format on a digital video recorder, wherein the stored multimedia content in the proprietary format is configured for playback by the digital video recorder and is not intended for playback on the media device;
   receiving the multimedia content from the digital video recorder;
   transforming, by the computer processor, the multimedia content into a format that is playable on the media device; and
   providing the transformed multimedia content in the format playable on the media device to the media device.

2. The method of claim 1, wherein said transforming comprises encoding the multimedia content into a compressed format.

3. The method of claim 1, wherein the received multimedia content is in a digital format.

4. The method of claim 1, wherein the received multimedia content is in an analog format.

5. A tangible computer-readable medium having instructions stored thereon that are readable by a computing device in order to cause the computing device to perform operations comprising:

receiving a request for multimedia content stored in a proprietary format by a digital video recorder, wherein the proprietary format is configured for playback by the digital video recorder and is not intended for playback on a playback device;

accessing the requested multimedia content from the digital video recorder;

transforming the multimedia content into a format that is playable by the playback device; and providing the transformed multimedia content to the playback device in the format playable by the playback device.

6. The tangible computer-readable medium of claim 5, wherein the operations further comprise:

storing on a storage device associated with the computing device at least a portion of the transformed multimedia content in the format playable on the playback device.

7. The tangible computer-readable medium of claim 5, wherein said transforming comprises applying one or more decoding algorithms to the accessed multimedia content.

8. The tangible computer-readable medium of claim 5, wherein said transforming comprises compressing the accessed multimedia content.

9. The tangible computer-readable medium of claim 5, wherein said accessing comprises receiving the multimedia content at the computing device via an audio-visual signal.

10. The tangible computer-readable medium of claim 9, wherein said transforming comprises encoding the audio-visual signal into the format that is playable by the playback device.

11. The tangible computer-readable medium of claim 5, wherein the format playable by the playback device comprises one or more of MPEG-1, MPEG-2, MPEG-4, MPEG-7 or AVI format.

12. The tangible computer-readable medium of claim 5, wherein the playback device comprises a portable media player that accesses the transformed multimedia content via one or more wired or wireless communication links with the computing device.

13. A computing system comprising:

a processor configured to execute software instructions;

a computer readable medium storing software instructions for execution by the processor in order to cause the computing system to perform operations comprising:

receiving a request for multimedia content from a playback device, wherein the multimedia content is stored in a proprietary format configured for playback by a digital video recorder and not intended for playback on the playback device;

accessing the requested multimedia content;

transforming the multimedia content into a format that is playable by the playback device; and transmitting the transformed multimedia content to the playback device in the format playable by the playback device.

14. The computing system of claim 13, wherein the operations further comprise:

storing on a storage device at least a portion of the transformed multimedia content in the format playable on the playback device.

15. The computing system of claim 13, wherein said transforming comprises applying one or more decoding algorithms to the accessed multimedia content.

16. The computing system of claim 13, wherein said accessing comprises receiving the multimedia content at the computing system via an audio-visual signal.

17. The computing system of claim 13, wherein said accessing comprises receiving the multimedia content via a wired communication link with the digital video recorder.

18. The computing system of claim 16, wherein said transforming comprises encoding the audio-visual signal into the format that is playable by the playback device.

19. The computing system of claim 13, wherein the format playable by the playback device comprises one or more of MPEG-1, MPEG-2, MPEG-4, MPEG-7 or AVI format.

20. The computing system of claim 13, wherein the playback device comprises a portable media player that accesses the transformed multimedia content via one or more wired or wireless communication links with the computing system.

\* \* \* \* \*

UNITED STATES PATENT AND TRADEMARK OFFICE
CERTIFICATE OF CORRECTION

PATENT NO. : 8,565,577 B2  
APPLICATION NO. : 12/891621  
DATED : October 22, 2013  
INVENTOR(S) : Bilbrey It is certified that error appears in the above-identified patent and that said Letters Patent is hereby corrected as shown below:

On the title page, item (54), and in the Specification, Column 1, Lines 1-4, Title, delete "SYSTEM AND METHODOLOGY FOR UTILIZING A PORTABLE MEDIA PLAYER CROSS-REFERENCE TO RELATED APPLICATIONS" and insert -- SYSTEM AND METHODOLOGY FOR UTILIZING A PORTABLE MEDIA PLAYER --, therefor.

In the Drawings

In Fig. 4a, Sheet 4 of 11, for Tag "344", in Line 2, delete "BEGNNING" and insert -- BEGINNING --, therefor, as in attached Sheet below.

Signed and Sealed this  
Eighth Day of April, 2014

Michelle K. Lee  
*Deputy Director of the United States Patent and Trademark Office*